US011768765B2

(12) United States Patent
Cariello

(10) Patent No.: US 11,768,765 B2
(45) Date of Patent: Sep. 26, 2023

(54) HOST DEVICE PHYSICAL ADDRESS ENCODING

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/587,588

(22) Filed: Jan. 28, 2022

(65) Prior Publication Data
US 2022/0156181 A1 May 19, 2022

Related U.S. Application Data

(63) Continuation of application No. 16/418,845, filed on May 21, 2019, now Pat. No. 11,237,953.

(51) Int. Cl.
*G06F 12/02* (2006.01)
*G06F 3/06* (2006.01)
*G06F 12/1009* (2016.01)

(52) U.S. Cl.
CPC .......... *G06F 12/0246* (2013.01); *G06F 3/064* (2013.01); *G06F 3/0688* (2013.01); *G06F 12/1009* (2013.01); *G06F 2212/2022* (2013.01); *G06F 2212/7201* (2013.01); *G06F 2212/7205* (2013.01); *G06F 2212/7211* (2013.01)

(58) Field of Classification Search
None
See application file for complete search history.

(56) References Cited

U.S. PATENT DOCUMENTS

| 2011/0072188 A1 | 3/2011 | Oh et al. |
| 2013/0250686 A1 | 9/2013 | Marukame et al. |
| 2014/0129761 A1* | 5/2014 | Kwon ................. G06F 12/0246 711/103 |

(Continued)

FOREIGN PATENT DOCUMENTS

WO    WO-2019113820 A1    6/2019

OTHER PUBLICATIONS

U.S. Appl. No. 16/418,845, Non Final Office Action dated Sep. 28, 2020, 22 pgs.

(Continued)

*Primary Examiner* — Michael Alsip
(74) *Attorney, Agent, or Firm* — Schwegman Lundberg & Woessner, P.A.

(57) ABSTRACT

Systems and methods are disclosed comprising receiving L2P table information from a storage system over a communication interface, maintaining a host L2P table at a physical address using the received L2P table information, and providing a read command to the storage system for first data associated with a first LBA and a host L2P entry associated with the first data. The host L2P entry can include a physical address of the first LBA on the storage system according to the host L2P table and a physical address of a portion of the L2P table on the storage system associated with the first LBA. Control circuitry of the storage system can validate the physical address of the first LBA from the host L2P entry using the physical address of the portion of the host L2P table associated with the first LBA.

20 Claims, 6 Drawing Sheets

(56) References Cited

U.S. PATENT DOCUMENTS

| | | | |
|---|---|---|---|
| 2014/0195725 A1* | 7/2014 | Bennett | G06F 12/0246 |
| | | | 711/103 |
| 2015/0039814 A1* | 2/2015 | Lim | G06F 12/0246 |
| | | | 711/103 |
| 2016/0078946 A1 | 3/2016 | Byun | |
| 2017/0068621 A1* | 3/2017 | Watanabe | G06F 3/0679 |
| 2019/0034347 A1 | 1/2019 | Haswell | |
| 2019/0108131 A1 | 4/2019 | Lee et al. | |
| 2019/0121540 A1 | 4/2019 | Shin et al. | |
| 2019/0129856 A1 | 5/2019 | Jean | |
| 2019/0258585 A1 | 8/2019 | Marcu et al. | |
| 2020/0320008 A1 | 10/2020 | Byun et al. | |
| 2020/0371908 A1 | 11/2020 | Cariello | |

OTHER PUBLICATIONS

U.S. Appl. No. 16/418,845, Response filed Dec. 28, 2020 to Non Final Office Action dated Sep. 28, 2020, 15 pgs.

U.S. Appl. No. 16/418,845, Non Final Office Action dated Jan. 21, 2021, 29 pgs.

U.S. Appl. No. 16/418,845, Response filed Apr. 21, 2021 to Non Final Office Action dated Jan. 21, 2021, 16 pgs.

U.S. Appl. No. 16/418,845, Final Office Action dated May 11, 2021, 33 pgs.

U.S. Appl. No. 16/418,845, Response filed Aug. 11, 2021 to Final Office Action dated May 11, 2021, 16 pgs.

U.S. Appl. No. 16/418,845, Notice of Allowance dated Sep. 22, 2021, 9 pgs.

* cited by examiner

HOST DEVICE PHYSICAL ADDRESS ENCODING

PRIORITY APPLICATION

This application is a continuation of U.S. application Ser. No. 16/418,845, filed May 21, 2019, which is incorporated herein by reference in its entirety.

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems (e.g., hosts) typically include a host processor, a first amount of host memory (e.g., main memory, often volatile memory, such as DRAM) to support the host processor, and one or more storage systems (e.g., often non-volatile memory, such as flash memory) that provide additional storage to retain data in addition to or separate from the main memory.

A storage system, such as a solid-state drive (SSD), can include a memory controller and one or more memory devices, including a number of (e.g., multiple) dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

Software (e.g., programs), instructions, operating systems (OS), and other data are typically stored on storage systems and accessed by main memory for use by the host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different forms of volatile memory, such as a group of static memory (e.g., a cache, often SRAM), often faster than the main memory, in certain examples, configured to operate at speeds close to or exceeding the speed of the host processor, but with lower density and higher cost.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
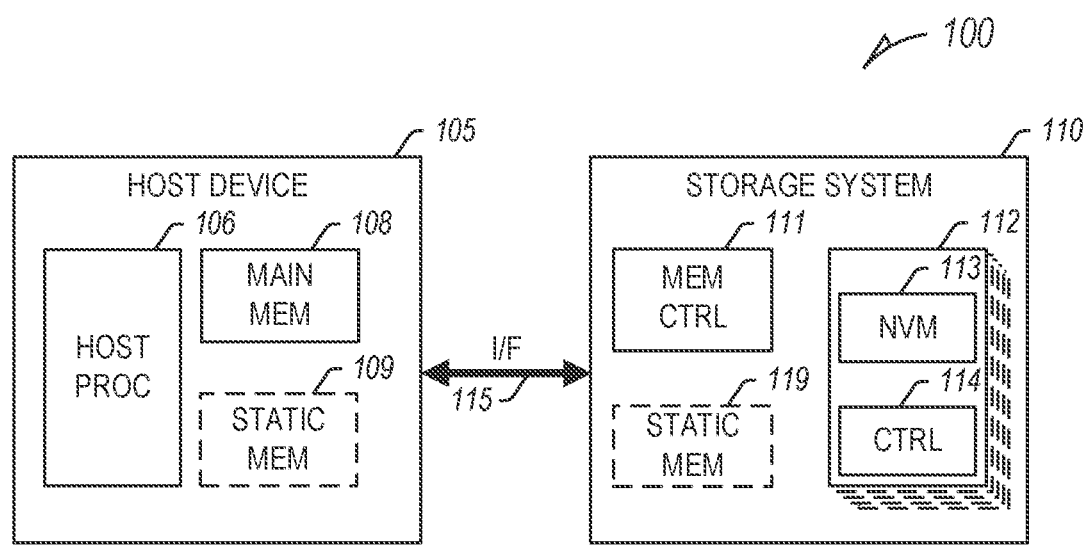
FIG. 1 illustrates an example host system including a host device and a storage system.

Modern memory devices, particularly non-volatile memory devices, such as NAND flash devices, etc., frequently relocate data, such as to refresh stored data or otherwise manage data in the memory devices (e.g., garbage collection, wear leveling, drive management, etc.). In certain examples, a logical block address (LBA) of the stored data can remain static, while a physical address (PA) of the stored data may change. The relationship between the LBA and the physical address can be maintained using logical-to-physical (L2P) information (e.g., an L2P map, table, etc.), typically in volatile memory (e.g., static memory, such as static random-access memory (SRAM), cache, etc.) of the storage system, such as to speed access to the physical address on the storage system given a particular LBA.

When a read command occurs, the L2P information (e.g., an L2P map, table, etc.) can be referenced to locate the requested data. However, the size of the L2P information is typically larger than the available volatile memory of the memory controller. A miss occurs when requested L2P information is not currently loaded in the volatile memory. In such instances, the storage system (e.g., firmware (FW) of the memory controller, etc.) can free space in the volatile memory (e.g., SRAM) by discarding or flushing to non-volatile memory (e.g., NAND) some L2P information (e.g., an L2P table chunk, etc.) and loading the requested L2P information (e.g., an L2P table chunk, etc.) from the non-volatile memory (e.g., NAND), adding latency to the read command and impacting system performance.

To improve system performance, such as during read commands or other memory operations, a portion of the L2P information can be stored on a host device, such as in a host memory. The host device can request L2P information from the storage system using a read buffer command, receive L2P information from the storage system in response, and manage the L2P information in host memory. The host device can provide the physical address to the storage system with a read command, reducing L2P access time on the storage system to provide the requested information, further reducing device latency and increasing system performance.

If the entire L2P map is managed at the host device, a 100% L2P information hit ratio can be attained, but due to new host writes and internal relocation of data (e.g., garbage collection), some of the addresses stored at the host device can become invalid, requiring the L2P information to be updated at the storage system. If the L2P information hit ratio falls below an acceptable threshold, or if a number of L2P misses reaches a threshold, the storage system can notify the host device that the L2P information in host memory should be updated, such as using a flag, a bitmap, etc., and the host device can request updated L2P information.

In an example, control circuitry of the storage system (e.g., a memory or device controller of the storage system, such as a universal flash storage (UFS) device, etc.) can be configured to manage portions of the non-volatile memory in one or more regions or sub-regions of a particular sub-region size. Regions and sub-regions can be ranges in the logic space. For example, a 64 GB memory device can be divided into 64 1 GB regions. A 1 GB region can be divided into 16 sub-regions of 64 MB. If each LBA is a 4 kB of data, a sub-region can be formed by 16,384 consecutive LBA, and a region can be formed by 262,144 consecutive LBA. Such numbers, ranges, and sizes are illustrative, and in other examples, other numbers, ranges, and sizes can be used.

For management purposes, each sub-region can be divided into a number of clusters. A cluster can represent a group consecutive LBA. Active regions or sub-regions can include regions or sub-regions currently managed by the control circuitry. In an example, a single cluster can represent 16 LBA. If one LBA in a cluster is invalid, the cluster can be marked as invalid. The validity of the clusters can be tracked in a data structure (e.g., a bitmap, etc.) with a first amount of dedicated volatile memory (e.g., 128 kB of dedicated SRAM, etc.) of the storage system. For example, a single sub-region can include a number of clusters (e.g., 1024 clusters, etc.), where a cluster can include a group of physical addresses (e.g., 1000 physical addresses, etc.). An L2P table can represent one or more sub-regions or clusters. The memory or device controller can be configured to update the host device when a percentage of the valid (e.g., unchanged, etc.) clusters falls below a threshold (e.g., 50%, etc.).

In certain examples, the memory or device controller may not be able to maintain the data structure in volatile memory during low-power states (e.g., "sleep," "power down," etc.), such as due to current leakage, etc. When returning to an active state after resuming from a low-power state, sub-regions with at least one changed physical address (PA) can be invalidated, negating the benefits of the stored L2P information. In certain examples, if a single cluster in the bitmap is invalid, or a single physical address in one of the clusters, the entire sub-region can be invalidated, and the table must be rebuilt.

In an example, each L2P entry can have 8 bytes (e.g., 1 bit) of space (or more in certain examples). The physical address (PA) of desired read data may require only 4 bytes, leaving 4 free bytes in the L2P entry. The present inventors have recognized, among other things, that host device physical address encoding, for example, in the additional/extra bytes of the L2P entry, can further increase system performance and efficiency. In an example, the additional/extra bytes (e.g., 4 bytes) can be used to store the physical address of the L2P table as a separate check on the validity of the clusters or sub-regions, such as confirmation of the physical address of the L2P table with stored L2P table information on a table in the storage system (e.g., a second-level L2P table, such as described below, etc.).

For example, when resuming from a low-power state, the storage system (e.g., firmware (FW) of the storage system, etc.) can load L2P information (e.g., an L2P table or portions of a data structure representing L2P information, etc., such as from non-volatile memory into volatile memory, etc.) to serve an incoming read command associated with an LBA of the L2P information. The L2P information to be loaded can depend on, among other things, the flash translation layer (FTL) structure of the storage system (e.g., block management, translation between the logical and physical addresses, etc.), and the information retained on the volatile memory, etc. In certain examples, the required L2P information can be loaded in a single volatile memory access. In other example, multiple memory accesses can be required to load the L2P information, depending on the FLT structure, the size of the L2P information, and the information still present on the volatile memory, etc. The physical address of the L2P information at the host device can be used to validate the host device physical address encoding, such as by comparing the physical address of the L2P information at the host device with a corresponding physical address stored on a table at the storage system.

If the storage system confirms the received physical address of the L2P information from the host device matches the corresponding information at the storage system, the speed of the current read can increase, as L2P information does not have to be loaded/refreshed at the host, and in certain examples, the physical address from the host device can be used to perform the requested memory operation. In addition, the speed of subsequent reads covered by that sub-region of L2P will increase, until the information needs to be re-loaded/refreshed. The benefit (e.g., speed, power savings, etc.) of such management increases with the ratio between host device L2P sub-regions and L2P chunk sizes (e.g., sub-region to chunk size of 2:1, 4:1, 8:1, 16:1, etc.). However, even a ratio of 1:1 can be beneficial, as it avoids the effort to determine each valid/invalid region before sleep and decreases a host device footprint by eliminating random tokens (e.g., between different memory devices of the storage system, between the host device and the storage system, etc.), or determination of each physical address of each chunk, etc.

FIG. 1 illustrates an example system (e.g., a host system) 100 including a host device 105 and a storage system 110 configured to communicate over a communication interface (I/F) 115 (e.g., a bidirectional parallel or serial communication interface). In an example, the communication interface 115 can be referred to as a host interface. The host device 105 can include a host processor 106 (e.g., a host central processing unit (CPU) or other processor or processing circuitry, such as a memory management unit (MMU), interface circuitry, etc.). In certain examples, the host device 105 can include a main memory (MAIN MEM) 108 (e.g., DRAM, etc.) and optionally, a static memory (STATIC MEM) 109, to support operation of the host processor (HOST PROC) 106.

The storage system 110 can include a universal flash storage (UFS) device, an embedded MMC (eMMC™) device, or one or more other memory devices. For example, if the storage system 110 includes a UFS device, the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the storage system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller (MEM CTRL) 111 and a non-volatile memory device 112. The memory controller 111 can optionally include a limited amount of static memory 119 to support operations of the memory controller 111. In an example, the non-volatile memory device 112 can include a number of non-volatile memory devices (e.g., dies or LUNs), such as one or more stacked flash memory devices (e.g., as illustrated with the stacked dashes underneath the non-volatile memory device 112), etc., each including non-volatile memory (NVM) 113 (e.g., one or more groups of non-volatile memory cells) and a device controller (CTRL) 114 or other periphery circuitry thereon (e.g., device logic, etc.), and controlled by the memory controller 111 over an internal storage-system communication interface (e.g., an Open NAND Flash Interface (ONFI) bus, etc.) separate from the communication interface 115.

Flash memory devices typically include one or more groups of one-transistor, floating gate (FG) or replacement gate (RG) memory cells. Two common types of flash memory array architectures include NAND and NOR architectures. The memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D Cross Point, HRAM, MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., 2', where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc.

The storage system 110 can include a multimedia card (MMC) solid-state storage device (e.g., micro secure digital (SD) cards, etc.). MMC devices include a number of parallel interfaces (e.g., an 8-bit parallel interface) with a host device 105, and are often removable and separate components from the host device. In contrast, embedded MMC (eMMC) devices are attached to a circuit board and considered a component of the host device, with read speeds that rival serial ATA (SATA) based SSD devices. As demand for mobile device performance continues to increase, such as to fully enable virtual or augmented-reality devices, utilize increasing networks speeds, etc., storage systems have shifted from parallel to serial communication interfaces between the storage system and a host device. UFS devices, including controllers and firmware, communicate with a host device using a low-voltage differential signaling (LVDS) serial interface with dedicated read/write paths, further advancing read/write speeds between a host device and a storage system.

In three-dimensional (3D) architecture semiconductor memory device technology, vertical floating gate (FG) or replacement gate (RG) (or charge trapping) storage structures can be stacked, increasing the number of tiers, physical pages, and accordingly, the density of memory cells in a memory device. Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 111 can receive instructions from the host device 105, and can communicate with the non-volatile memory device 112, such as to transfer data to (e.g., write or erase) or from (e.g., read) one or more of the memory cells of the non-volatile memory device 112. The memory controller 111 can include, among other things, circuitry or firmware, such as a number of components or integrated circuits. For example, the memory controller 111 can include one or more memory control units, circuits, or components configured to control access across the memory array and to provide a translation layer between the host device 105 and the storage system 100, such as a memory manager, one or more memory management tables, etc.

The memory manager can include, among other things, circuitry or firmware, such as a number of components or integrated circuits associated with various memory management functions, including, among other functions, wear leveling (e.g., garbage collection or reclamation), error detection or correction, block retirement, or one or more other memory management functions. The memory manager 125 can parse or format host commands (e.g., commands received from the host device 105) into device commands (e.g., commands associated with operation of a memory array, etc.), or generate device commands (e.g., to accomplish various memory management functions) for the device controller 114 or one or more other components of the storage system 110.

The memory manager can include a set of management tables configured to maintain various information associated with one or more component of the storage system 110 (e.g., various information associated with a memory array or one or more memory cells coupled to the memory controller 111). For example, the management tables can include information regarding block age, block erase count, error history, or one or more error counts (e.g., a write operation error count, a read bit error count, a read operation error count, an erase error count, etc.) for one or more blocks of memory cells coupled to the memory controller 111. In certain examples, if the number of detected errors for one or more of the error counts is above a threshold, the bit error can be referred to as an uncorrectable bit error. The management tables can maintain a count of correctable or uncorrectable bit errors, among other things. In an example, the management tables can include translation tables or a L2P mapping.

The memory manager can implement and use data structures to reduce storage system 110 latency in operations that involve searching L2P tables for valid pages, such as garbage collection. To this end, the memory manager is arranged to maintain a data structure (e.g., table region data structure, tracking data structure, etc.) for a physical block. The data structure includes indications of L2P mapping table regions, of the L2P table. In certain examples, the data structure is a bitmap (e.g., a binary array). In an example, the bitmap includes a bit for each region of multiple, mutually exclusive, regions that span the L2P table.

The non-volatile memory device 112 or the non-volatile memory 113 (e.g., one or more 3D NAND architecture semiconductor memory arrays) can include a number of memory cells arranged in, for example, a number of devices, planes, blocks, physical pages, super blocks, or super pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements. A super block can include a combination of multiple blocks, such as from different planes, etc., and a window can refer to a stripe of a super block, typically matching a portion covered by a physical-to-logical (P2L) table chunk, etc., and a super page can include a combination of multiple pages.

The term "super" can refer to a combination or multiples of a thing or things. For examples, a super block can include a combination of blocks. If a memory device includes 4 planes, a super block may refer to the same block on each plane, or a pattern of blocks across the panes (e.g., a combination of block 0 on plane 0, block 1 on plane 1, block 2 on plane 2, and block 3 on plane 3, etc.). In an example, if a storage system includes multiple memory devices, the combination or pattern of blocks can extend across the multiple memory devices. The term "stripe" can refer to a pattern of combination or pattern of a piece or pieces of a thing or things. For example, a stripe of a super block can refer to a combination or pattern of pages from each block in the super block.

In operation, data is typically written to or read from the storage system 110 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 kB may include 4 kB of user data (e.g., 8 sectors assuming a sector size of 512B) as well as a number of bytes (e.g., 32B, 54B, 224B, etc.) of auxiliary or metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code (ECC) data than a memory device with a lower bit error rate). As an example, an MLC NAND flash device may have a higher bit error rate than a corresponding SLC NAND flash device. As such, the MLC device may require more metadata bytes for error data than the corresponding SLC device.

In an example, the data in a chunk or data unit can be handled in an optimized manner throughout its tenure on the storage system. For example, the data is managed as one unit during data migration (e.g., garbage collection, etc.) such that the efficient read/write properties are preserved as data is moved to its new physical location on the storage system. In certain examples, the only limit to the number of chunks, data units, or blocks configurable for storage, tagging, etc., are the capacities of the system.

In an example, one or more of the host device 105 or the storage system 110 can include a temperature sensor configured to sense temperature information of one or more of the host device 105, the storage system 110, or the environment in which the host device 105 or the storage system 110 is operating.

In an example, the host device 105 can be configured to provide data to the storage system 110 including user and auxiliary data. In certain examples, the auxiliary data can include temperature information, such as from the host device 105 (e.g., from a temperature circuit or temperature sensor at the host device 105, etc.). In other examples, the host device 105 can provide data to the storage system 110 without temperature information, and the storage system 110 can be configured to augment the data received from the host device 105 with temperature information, such as when the data is stored in the storage system 110, for example, in one or more memory devices of the non-volatile memory device 112.

The storage system 110 can include a temperature circuit 117 configured to determine a statistical measure of temperature information for one or more groups of memory cells, for example, using temperature information received from the host device 105, the storage system 110, or one or more other sensor or component configured to provide temperature information, such as at the time the storage system 110 writes received information to the one or more groups of memory cells. In an example, the temperature circuit 117 can be a component of the memory controller 111. In other examples, the temperature circuit 117 can be a component of the storage system 110 separate from the memory controller 111.

Figure 2:
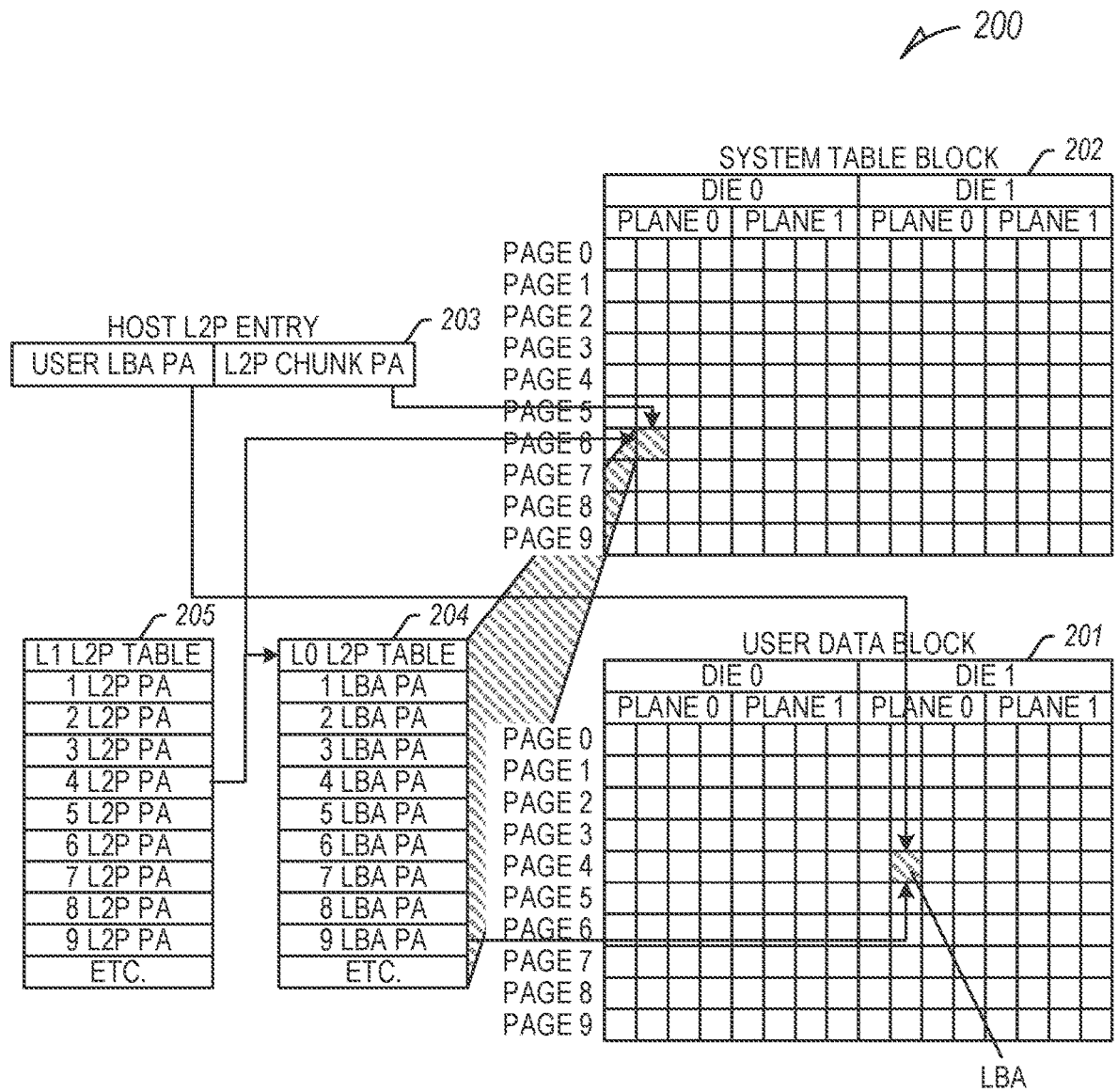
FIG. 2 illustrates an example data relationship between a user data block, such as stored on a storage system, and a host table block, such as stored on a host device.

FIG. 2 illustrates an example data relationship 200 between a user data block 201 containing host data and a system table block 202 containing L2P information. The user data block 201 and system table block 202 can be formed by multiple dies (e.g., DIE 0, DIE 1, etc.), planes (e.g., PLANE 0, PLANE 1), pages (e.g., PAGE 0-9, etc.), etc.

The data relationship 200 includes a host L2P entry 203, including a separate user LBA physical address (e.g., a storage system physical address associated with the desired LBA) and an L2P chunk physical address indicating a physical address of the L2P chunk containing the LBA physical address at the time of the L2P table transfer to the host device. In an example, the L2P chunk physical address can be encoded as a specific number or series of bits in one of several (e.g., one to four) remaining/unused bytes, or a group of random numbers can be associated with a specific chunk, number of chunks, or regions, sub-regions, etc. of the host table block. The L2P chunk physical address can be encoded or decoded, such as by the storage system (e.g., using a memory controller, a device controller, etc.).

In an example, the host device can provide, along with the read request of a Logical Block Address (LBA), the host L2P entry 203 to a storage system, including the separate user LBA physical address and the L2P chunk physical address. The storage system can receive the host L2P entry 203, identify the LBA and verify on a bitmap whether the associated information received by host is valid. If such information is valid, the operation associated with the host L2P entry 203 can proceed.

In certain examples, such as during garbage collection or one or more other data or maintenance operations on the storage system, data can be moved on the storage system. In an example, if the bitmap is not available (e.g., such as due to an intervening low-power state, etc.), a second level (e.g., L1) L2P table, such as an L1 L2P table 205, can be used to confirm the match. The L1 L2P table 205 can store the physical address of a number of L2P chunks, such as on system table block 202. In an example, the storage system can receive the host L2P entry 203, identify the L2P chunk physical address and confirm a match with the address contained in a second level L2P table 205. If the storage system confirms the match, the match between each LBA physical address contained in the L2P entry 203 and the physical address contained in the first level (e.g., L0) L2P table may also be confirmed. Thus, the storage device can utilize the LBA physical address to speed up the read operation and eventually update the bitmap associated with the L2P chunk, saving time, power, and resources.

Figure 3:
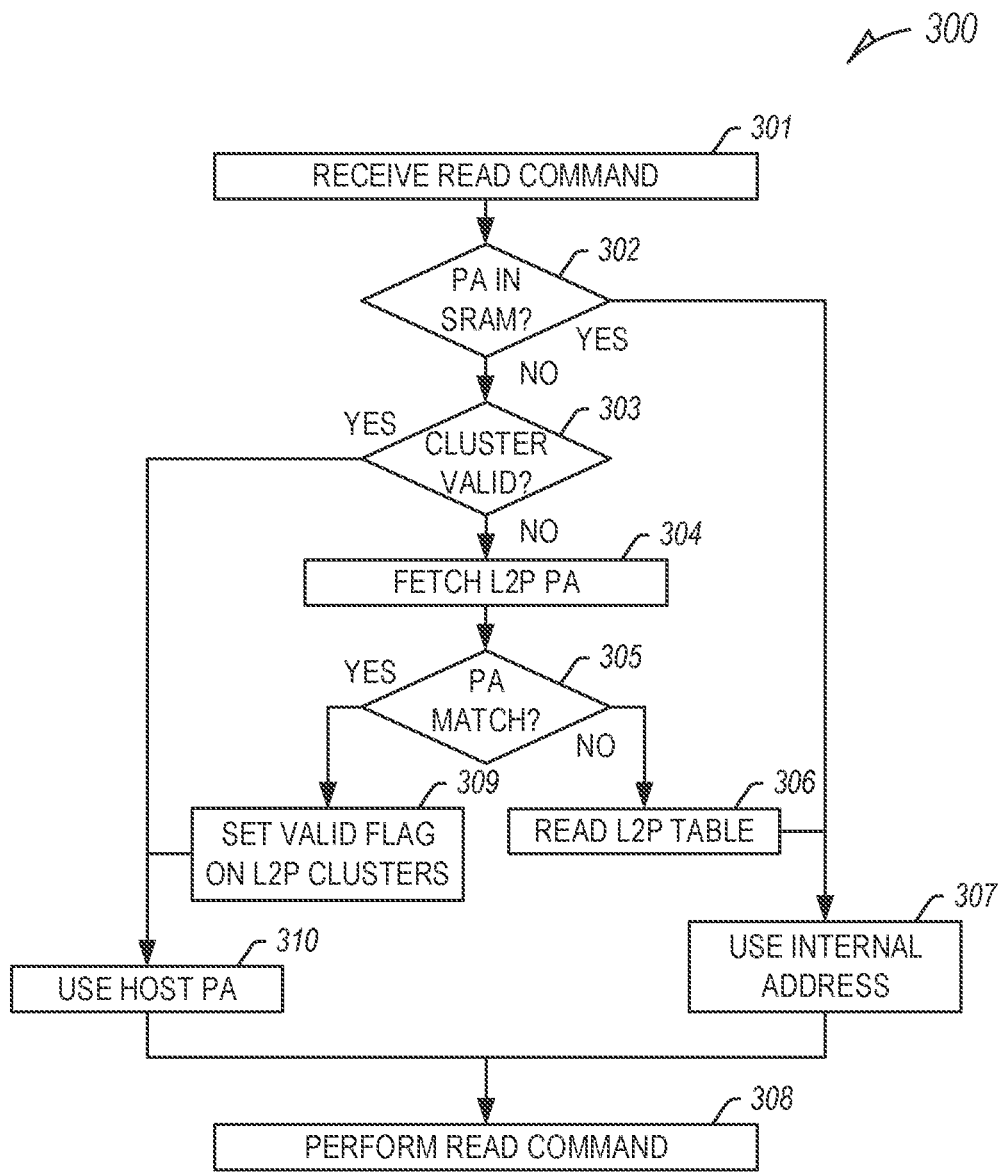
FIG. 3 illustrates an example method of receiving and performing a read command.

FIG. 3 illustrates an example method 300 of receiving and performing a read command. At 301, a read command is received, such as at a memory controller of a storage system from a host device, in certain examples, originating from a host processor or other host circuitry and facilitated by host and storage system interface circuitry. In an example, the host device can be configured to store L2P information, such as received from the storage system, associating a logical block address (LBA) of stored data with a physical address (PA) on the storage system. In an example, the read command can include host L2P information, such as one or more of the physical address of the data associated with the read command on the storage system, a user LBA physical address, or, in certain examples, a host L2P entry 203 including a physical address of the L2P information on the storage system, etc.

At 302, if the physical address of the LBA requested from the host device is in volatile memory of the storage system (e.g., cache, SRAM, etc.), then, at 307, the internal address, such as that stored in the volatile memory, can be used to perform the read command at 308. Typically, only a limited number of physical addresses are stored in volatile memory, such as active regions or sub-regions of the storage system awaiting update to the host device, etc.

If, at 302, the physical address is not in volatile memory of the storage system, then the validity of the physical address received from the host device is determined at 303 looking the validity flag of the cluster of addresses including the one of the requested LBA.

The storage system can include a number of clusters of physical addresses of various sizes, for example, stored in data structure (e.g., a bitmap, etc.) with a first amount of dedicated volatile memory (e.g., 128 kB of dedicated SRAM, etc.) of the storage system. Further, clusters can be grouped, and a bitmap or other data structure can be used to track the validity of each cluster of the group. If the storage system has undergone a low-power state, the data structure may have been discarded, and validity may not be determined. In other examples, if one or more (ora threshold number) of the physical addresses of the cluster has changed or data has been moved and the cluster has not yet been updated, the cluster may be marked as invalid, such as by the memory controller, etc.

If, at 303, the cluster is determined to be valid (or in certain examples, is not determined to be invalid), such as by the memory controller reading a flag, bitmap, or other indication, etc., then, at 310, the physical address received from the host device can be used to perform the read command at 308. In contrast, if the cluster is determined to be invalid (or in certain examples, is not determined to be valid, such that the state is unknown, etc.), many storage systems would then proceed to 306, load and read the L2P tables for that received physical or logical block address from the host device, and at 307, use the internal address to perform the read command at 308. However, in certain examples, such as when resuming from low-power states, the individual clusters, even though indicated as invalid, still contain valid, accurate information.

Accordingly, if, at 303, the cluster is determined to be invalid (or in certain examples, is not determined to be valid, etc.), such as when resuming from a low-power state, etc., then, at 304, a physical address of the L2P information on the storage system, such as stored in a second level L2P table, can be fetched (e.g., such as indicated in the L1 L2P table 205, etc.).

At 305, the physical address of the L2P information on the storage system can be compared to a received L2P physical address, such as received with the read command. If, at 305, the fetched physical address does not match the physical address received from the host device, then at 306 the L2P table for the received physical or logical block address from the host device can be read from the storage system and, at 307, the internal address can be used to perform the read command at 308.

If, at 305, the physical address of the L2P information does match the received L2P physical address, then, at 309, a flag, bitmap, or other indication indicating validity of the cluster containing the physical address received from the host can be set as valid and, at 310, the physical address received from the host device can be used to perform the read command at 308. In other examples, such as when resuming from a low-power state, if one cluster is determined to be valid, an additional one or more clusters, or all clusters, can be marked as valid. Operation can continue until the individual clusters are otherwise marked as invalid, such as by another low-power state, data movement, detected errors, etc.

Figure 4:
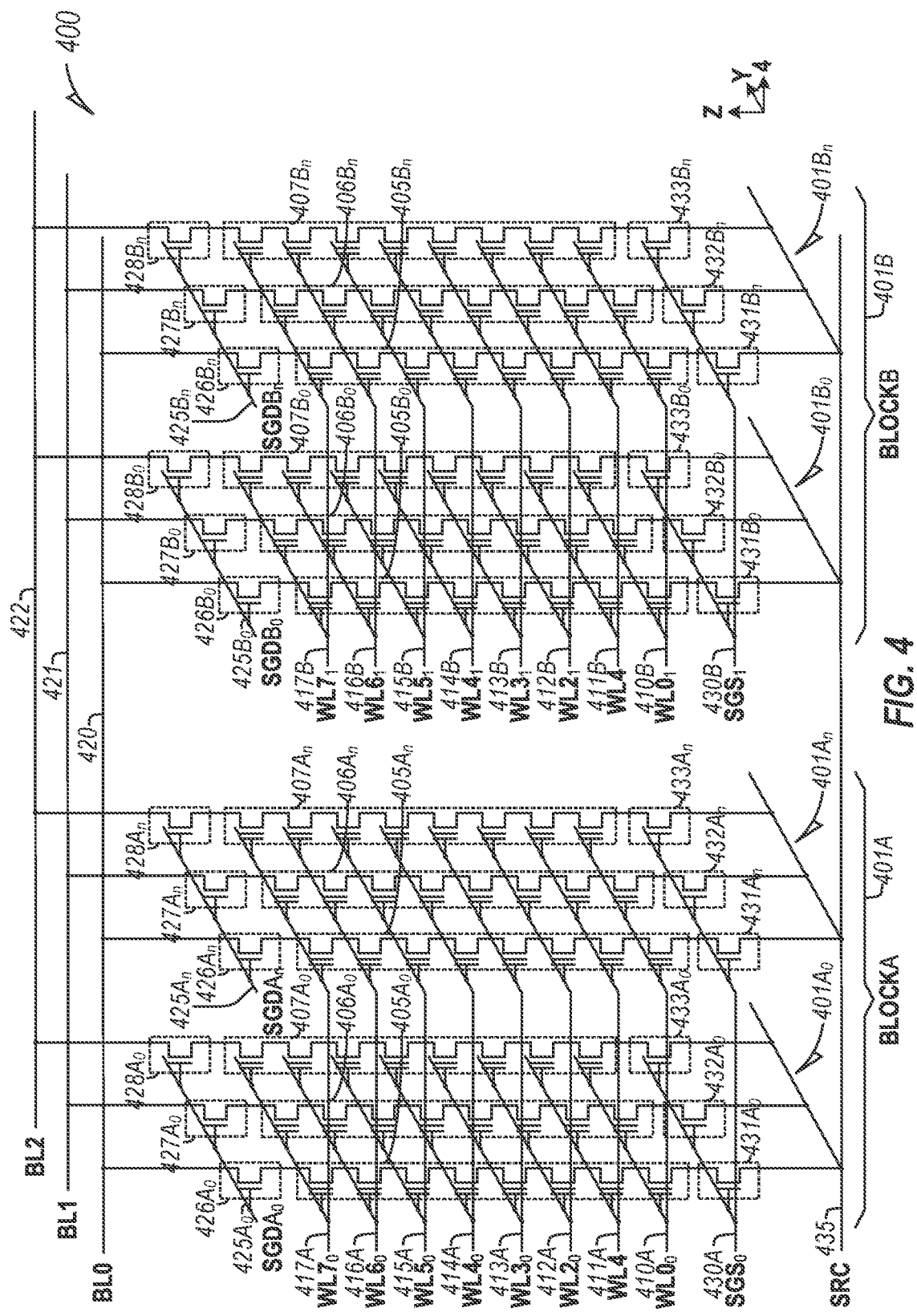
FIG. 4 illustrates an example schematic diagram of a 3D NAND architecture semiconductor memory array.

FIG. 4 illustrates an example schematic diagram of a 3D NAND architecture semiconductor memory array 400 including a number of strings of memory cells (e.g., first-third $A_0$ memory strings $405A_0$-$407A_0$, first-third $A_n$ memory strings $405A_n$-$407A_n$, first-third $B_0$ memory strings $405B_0$-$407B_0$, first-third $B_n$ memory strings $405B_n$-$407B_n$, etc.), organized in blocks (e.g., block A 401A, block B 401B, etc.) and sub-blocks (e.g., sub-block $A_0$ 401$A_0$, sub-block $A_n$ 401$A_n$, sub-block $B_0$ 401$B_0$, sub-block $B_n$ 401$B_n$, etc.). The memory array 400 represents a portion of a greater number of similar structures that would typically be found in a block, device, or other unit of a memory device.

Each string of memory cells includes a number of tiers of storage transistors (e.g., floating gate, replacement gate, charge trapping structures, etc.) stacked in the Z direction, source to drain, between a source line (SRC) 435 or a source-side select gate (SGS) (e.g., first-third $A_0$ SGS $431A_0$-$433A_0$, first-third $A_n$ SGS $431A_n$-$433A_n$, first-third $B_0$ SGS $431B_0$-$433B_0$, first-third $B_n$ SGS $431B_n$-$433B_n$, etc.) and a drain-side select gate (SGD) (e.g., first-third $A_0$ SGD $426A_0$-$428A_0$, first-third $A_n$ SGD $426A_n$-$428A_n$, first-third $B_0$ SGD $426B_0$-$428B_0$, first-third $B_n$ SGD $426B_n$-$428B_n$, etc.). Each string of memory cells in the 3D memory array can be arranged along the X direction as data lines (e.g., bit lines (BL) BL0-BL3 420-422), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 400 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 400 includes a control gate (CG) coupled to (e.g., electrically or otherwise operatively connected to) an access line (e.g., word lines (WL) $WL0_0$-$WL7_0$ 410A-417A, $WL0_1$-$WL7_1$ 410B-417B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $426A_0$-$428A_0$ can be accessed using an $A_0$ SGD line $SGDA_0$ $425A_0$, first-third $A_n$ SGD $426A_n$-$428A_n$ can be accessed using an $A_n$ SGD line $SGDA_n$ $425A_n$, first-third $B_0$ SGD $426B_0$-$428B_0$ can be accessed using a $B_0$ SGD line $SGDB_0$ $425B_0$, and first-third $B_n$ SGD $426B_n$-$428B_n$ can be accessed using a $B_n$ SGD line $SGDB_n$ $425B_n$. First-third $A_0$ SGS $431A_0$-$433A_0$ and first-third $A_n$ SGS $431A_n$-$433A_n$ can be accessed using a gate select line $SGS_0$ 430A, and first-third $B_0$ SGS $431B_0$-$433B_0$ and first-third $B_n$ SGS $431B_n$-$433B_n$ can be accessed using a gate select line $SGS_1$ 430B.

In an example, the memory array 400 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

In a NAND architecture semiconductor memory array, the state of a selected memory cell can be accessed by sensing a current or voltage variation associated with a particular data line containing the selected memory cell. The memory array 400 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., $WL4_0$), and thus, to a control gate of each memory cell coupled to the selected word lines. Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as $WL4_0$, a pass voltage of 10V can be applied to one or more other word lines, such as $WL3_0$, $WL5_0$, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to $WL4_0$, a pass voltage of 10V can be applied to $WL3_0$ and $WL5_0$, a pass voltage of 8V can be applied to $WL2_0$ and $WL6_0$, a pass voltage of 7V can be applied to $WL1_0$ and $WL7_0$, etc. In other examples, the pass voltages, or number of word lines, etc., can be higher or lower, or more or less.

Sense amplifiers can be coupled to one or more of the data lines (e.g., first, second, or third bit lines (BL0-BL2) 420-422), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 5:
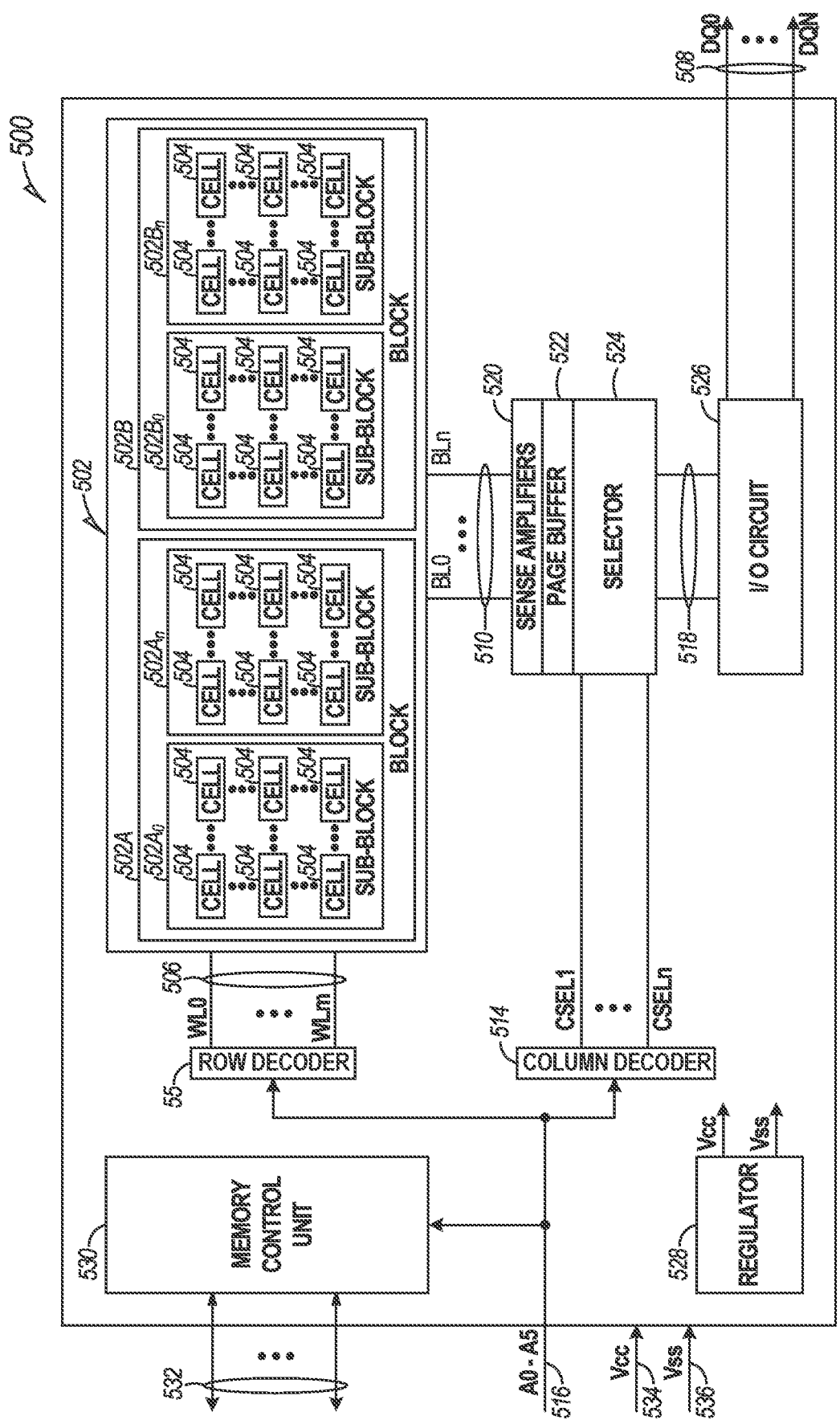
FIG. 5 illustrates an example block diagram of a memory module.

FIG. 5 illustrates an example block diagram of a memory device 500 including a memory array 502 having a plurality of memory cells 504, and one or more circuits or components to provide communication with, or perform one or more memory operations on, the memory array 502. Although shown with a single memory array 502, in other examples, one or more additional memory arrays, dies, or LUNs can be included herein. In certain examples, in a storage system having a number of dies or LUNs, the memory device 500 can represent a block diagram of circuits and components for each die or LUN. The memory device 500 can include a row decoder 512, a column decoder 514, sense amplifiers 520, a page buffer 522, a selector 524, an input/output (I/O) circuit 526, and a memory control unit 530.

The memory cells 504 of the memory array 502 can be arranged in blocks, such as first and second blocks 502A, 502B. Each block can include sub-blocks. For example, the first block 502A can include first and second sub-blocks $502A_0$, $502A_n$, and the second block 502B can include first and second sub-blocks $502B_0$, $502B_n$. Each sub-block can include a number of physical pages, each page including a number of memory cells 504. Although illustrated herein as having two blocks, each block having two sub-blocks, and each sub-block having a number of memory cells 504, in other examples, the memory array 502 can include more or fewer blocks, sub-blocks, memory cells, etc. In other examples, the memory cells 504 can be arranged in a number of rows, columns, pages, sub-blocks, blocks, etc., and accessed using, for example, access lines 506, first data lines 510, or one or more select gates, source lines, etc.

The memory control unit 530 can control memory operations of the memory device 500 according to one or more signals or instructions received on control lines 532, including, for example, one or more clock signals or control signals that indicate a desired operation (e.g., write, read, erase, etc.), or address signals (A0-AX) received on one or more address lines 516. One or more devices external to the memory device 500 can control the values of the control signals on the control lines 532, or the address signals on the address line 516. Examples of devices external to the memory device 500 can include, but are not limited to, a host, a memory controller, a processor, or one or more circuits or components not illustrated in FIG. 5.

The memory device 500 can use access lines 506 and first data lines 510 to transfer data to (e.g., write or erase) or from (e.g., read) one or more of the memory cells 504. The row decoder 512 and the column decoder 514 can receive and decode the address signals (A0-AX) from the address line 516, can determine which of the memory cells 504 are to be accessed, and can provide signals to one or more of the access lines 506 (e.g., one or more of a plurality of word lines (WL0-WLm)) or the first data lines 510 (e.g., one or more of a plurality of bit lines (BL0-BLn)), such as described above.

The memory device 500 can include sense circuitry, such as the sense amplifiers 520, configured to determine the values of data on (e.g., read), or to determine the values of data to be written to, the memory cells 504 using the first data lines 510. For example, in a selected string of memory cells 504, one or more of the sense amplifiers 520 can read a logic level in the selected memory cell 504 in response to a read current flowing in the memory array 502 through the selected string to the data lines 510.

One or more devices external to the memory device 500 can communicate with the memory device 500 using the I/O lines (DQ0-DQN) 508, address lines 516 (A0-AX), or control lines 532. The input/output (I/O) circuit 526 can transfer values of data in or out of the memory device 500, such as in or out of the page buffer 522 or the memory array 502, using the I/O lines 508, according to, for example, the control lines 532 and address lines 516. The page buffer 522 can store data received from the one or more devices external to the memory device 500 before the data is programmed into relevant portions of the memory array 502, or can store data read from the memory array 502 before the data is transmitted to the one or more devices external to the memory device 500.

The column decoder 514 can receive and decode address signals (A0-AX) into one or more column select signals (CSEL1-CSELn). The selector 524 (e.g., a select circuit) can receive the column select signals (CSEL1-CSELn) and select data in the page buffer 522 representing values of data to be read from or to be programmed into memory cells 504. Selected data can be transferred between the page buffer 522 and the I/O circuit 526 using second data lines 518.

The memory control unit 530 can receive positive and negative supply signals, such as a supply voltage (Vcc) 534 and a negative supply (Vss) 536 (e.g., a ground potential), from an external source or supply (e.g., an internal or external battery, an AC-to-DC converter, etc.). In certain examples, the memory control unit 530 can include a regulator 528 to internally provide positive or negative supply signals.

Figure 6:
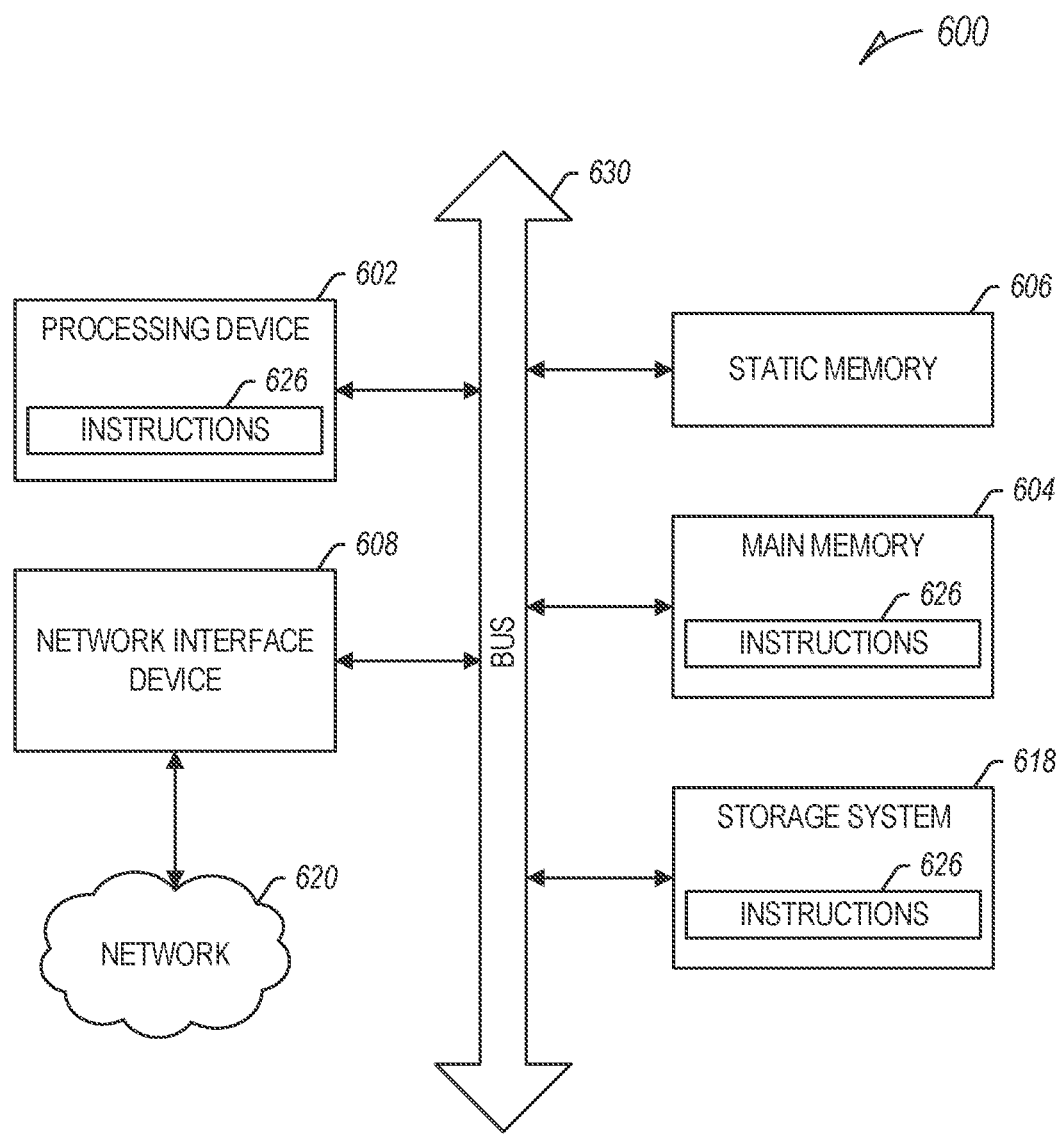
FIG. 6 illustrates an example block diagram of an information handling system.

FIG. 6 illustrates a block diagram of an example machine (e.g., a host system) 600 upon which any one or more of the techniques (e.g., methodologies) discussed herein may perform (e.g., such as those described in FIG. 1, etc.). In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 600 may include a processing device 602 (e.g., a hardware processor, a central processing unit (CPU), a graphics processing unit (GPU), a hardware processor core, or any combination thereof, etc.), a main memory 604 (e.g., read-only memory (ROM), dynamic random-access memory (DRAM) such as synchronous DRAM (SDRAM) or Rambus DRAM (RDRAM), etc.), a static memory 606 (e.g., static random-access memory (SRAM), etc.), and a storage system 618, some or all of which may communicate with each other via a communication interface (e.g., a bus) 630.

The processing device 602 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The computer system 600 can further include a network interface device 608 to communicate over a network 620.

The storage system 618 can include a machine-readable storage medium (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the computer system 600, the main memory 604 and the processing device 602 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the storage system 618 can be accessed by the main memory 604 for use by the processing device 602. The main memory 604 (e.g., DRAM) is typically fast, but volatile, and thus a different type of storage than the storage system 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the storage system 618 can be allocated to supplement the main memory 604; however, because the storage system 618 device is typically slower than the main memory 604, and write speeds are typically at least twice as slow as read speeds, use of virtual memory can greatly reduce user experience due to storage system latency (in contrast to the main memory 604, e.g., DRAM). Further, use of the storage system 618 for virtual memory can greatly reduce the usable lifespan of the storage system 618.

The instructions 624 may further be transmitted or received over a network 620 using a transmission medium via the network interface device 608 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, FI®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on"(in the absence of an express indication to the contrary); the terms "over" and "under" are expressly intended to identify a relative placement of structures (or layers, features, etc.), which expressly includes—but is not limited to--direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

Example 1 is a system, comprising: a host device comprising a host processor and a group of volatile memory cells; and a storage system comprising a group of non-volatile memory cells and control circuitry, wherein the control circuitry is configured to maintain a relationship between a logical block address (LBA) and a physical address (PA) of data stored on the group of non-volatile memory cells in a first-level logical-to-physical (L2P) table on the storage system, and to provide first-level L2P table information to the host device over a communication interface, wherein the host processor is configured to receive the first-level L2P table information from the storage system over the communication interface, and to maintain a host L2P table on the host device using the received first-level L2P table information, and wherein the host processor is configured to provide a read command to the storage system for first data associated with a first LBA and a host L2P entry associated with the first data, the host L2P entry comprising: a physical address of the first LBA on the storage system according to the host L2P table; and a physical address of a portion of the L2P table on the storage system associated with the first LBA.

In Example2, the subject matter of Example 1 optionally includes wherein the control circuitry is configured to maintain a relationship between the physical address of the L2P table on the storage system and the first-level L2P table associated with the first LBA in a second-level L2P table, wherein the control circuitry is configured to receive the read command associated with the first LBA and the host L2P entry, and wherein the control circuitry is configured to validate the physical address of the first LBA from the host L2P entry using the physical address of the portion of the host L2P table associated with the first LBA and the second-level L2P table.

In Example 3, the subject matter of Example 2 optionally includes wherein the storage system comprises a first group of volatile memory cells, wherein the group of non-volatile memory cells are organized into sub-regions, the sub-regions organized into multiple clusters of physical addresses, and wherein the control circuitry is configured to maintain a bitmap of validity of the multiple clusters on the first group of volatile memory cells.

In Example 4, the subject matter of Example 3 optionally includes wherein the control circuit is configured to assign a cluster as invalid in response to a detected low-power state of the storage system without a subsequent write or update of a portion of the bitmap associated with the cluster.

In Example 5, the subject matter of any one or more of Examples 3-4 optionally include wherein, in response to the received read command, the control circuitry is configured to determine the validity of the cluster associated with the first LBA and the host L2P entry, wherein, if the cluster associated with the first LBA and the host L2P entry is determined as invalid, the control circuitry is configured to determine a match of the physical address of the portion of the host L2P table associated with the first LBA and the physical address of the L2P table on the storage system stored in the second-level L2P table, and wherein, if the physical address of the portion of the host L2P table associated with the first LBA matches the physical address of the L2P table on the storage system stored in the second-level L2P table, the control circuitry is configured to assign the cluster associated with the first LBA and the host L2P entry as valid.

In Example 6, the subject matter of Example 5 optionally includes wherein, if the physical address of the portion of the host L2P table associated with the first LBA matches the physical address of the L2P table on the storage system stored in the second-level L2P table, the control circuitry is configured to assign each cluster associated with the portion of the host L2P table as valid associated with the host L2P entry as valid.

In Example 7, the subject matter of any one or more of Examples 3-6 optionally include wherein the communication interface includes a universal flash storage (UFS) interface, wherein the storage system includes a UFS device, and wherein the host device includes a UFS host device, and wherein the portion of the host L2P table includes an L2P chunk, wherein each sub-group is organized into multiple chunks, each chunk representing multiple clusters.

In Example 8, the subject matter of any one or more of Examples 1-7 optionally include wherein the host L2P entry associated with the first data comprises 8 bits, wherein the physical address of the first LBA on the storage system according to the host L2P table comprises 4 bytes, and wherein the physical address of a portion of the L2P table on the storage system associated with the first LBA comprises 4 bytes.

Example 9 is a system, comprising: a storage system comprising a group of non-volatile memory cells and control circuitry, wherein the control circuitry is configured to maintain a relationship between a logical block address (LBA) and a physical address (PA) of data stored on the group of non-volatile memory cells in a first-level logical-to-physical (L2P) table on the storage system, and to provide first-level L2P table information to a host device over a communication interface, wherein the control circuitry is configured to receive a read command from a host processor of the host device for first data associated with a first LBA and a host L2P entry associated with the first data, the host L2P entry comprising: a physical address of the first LBA on the storage system according to a host L2P table; and a physical address of a portion of the L2P table on the storage system associated with the first LBA, wherein the control circuitry is configured to maintain a relationship between the physical address of the L2P table on the storage system and the first-level L2P table associated with the first LBA in a second-level L2P table, and wherein the control circuitry is configured to validate the physical address of the first LBA from the host L2P entry using the physical address of the portion of the host L2P table associated with the first LBA and the second-level L2P table.

In Example 10, the subject matter of Example 9 optionally includes wherein the storage system comprises a first group of volatile memory cells, wherein the group of non-volatile memory cells are organized into sub-regions, the sub-regions organized into multiple clusters of physical addresses, wherein the control circuitry is configured to maintain a bitmap of validity of the multiple clusters on the first group of volatile memory cells, and wherein the control circuit is configured to assign a cluster as invalid in response to a detected low-power state of the storage system without a subsequent write or update of a portion of the bitmap associated with the cluster.

In Example 11, the subject matter of Example 10 optionally includes wherein, in response to the received read command, the control circuitry is configured to determine the validity of the cluster associated with the first LBA and the host L2P entry, wherein, if the cluster associated with the first LBA and the host L2P entry is determined as invalid, the control circuitry is configured to determine a match of the physical address of the portion of the host L2P table associated with the first LBA and the physical address of the L2P table on the storage system stored in the second-level L2P table, and wherein, if the physical address of the portion of the host L2P table associated with the first LBA matches the physical address of the L2P table on the storage system stored in the second-level L2P table, the control circuitry is configured to assign each cluster associated with the portion of the host L2P table as valid associated with the host L2P entry as valid.

Example 12 is a method, comprising: maintaining a relationship between a logical block address (LBA) and a physical address (PA) of data stored on a group of non-volatile memory cells of a storage system in a first-level logical-to-physical (L2P) table on the storage system using control circuitry of the storage system; providing, using the control circuitry, first-level L2P table information to a host device over a communication interface; receiving a read command from a host processor of the host device for first data associated with a first LBA and a host L2P entry associated with the first data, the host L2P entry comprising: a physical address of the first LBA on the storage system according to a host L2P table; and a physical address of a portion of the L2P table on the storage system associated with the first LBA; maintaining a relationship between the physical address of the L2P table on the storage system and the first-level L2P table associated with the first LBA in a second-level L2P table; and validating the physical address of the first LBA from the host L2P entry using the physical address of the portion of the host L2P table associated with the first LBA and the second-level L2P table.

In Example 13, the subject matter of Example 12 optionally includes wherein the group of non-volatile memory cells are organized into sub-regions, the sub-regions organized into multiple clusters of physical addresses, wherein the method comprises: maintaining, using the control circuitry, a bitmap of validity of the multiple clusters on a first group of volatile memory cells of the storage system; and assigning, using the control circuitry, a cluster as invalid in response to a detected low-power state of the storage system without a subsequent write or update of a portion of the bitmap associated with the cluster.

In Example 14, the subject matter of Example 13 optionally includes determining, using the control circuitry and in response to the received read command, the validity of the cluster associated with the first LBA and the host L2P entry; determining, using the control circuitry and if the cluster associated with the first LBA and the host L2P entry is determined as invalid, a match of the physical address of the portion of the host L2P table associated with the first LBA and the physical address of the L2P table on the storage system stored in the second-level L2P table; and assigning, using the control circuitry and if the physical address of the portion of the host L2P table associated with the first LBA matches the physical address of the L2P table on the storage system stored in the second-level L2P table, each cluster associated with the portion of the host L2P table as valid associated with the host L2P entry as valid.

Example 15 is a method, comprising: receiving, at a host processor of a host device, first-level L2P table information from a storage system over a communication interface; maintaining, using the host processor, a host L2P table on the host device using the received first-level L2P table information; and providing, using the host processor, a read command to the storage system for first data associated with a first LBA and a host L2P entry associated with the first data, the host L2P entry comprising: a physical address of the first LBA on the storage system according to the host L2P table; and a physical address of a portion of the L2P table on the storage system associated with the first LBA.

Example 16 is at least one non-transitory device-readable storage medium comprising instructions that, when executed by control circuitry of a storage system, cause the storage system to perform operations comprising: maintain a relationship between a logical block address (LBA) and a physical address (PA) of data stored on a group of non-volatile memory cells of a storage system in a first-level logical-to-physical (L2P) table on the storage system; provide first-level L2P table information to a host device over a communication interface; receive a read command from a host processor of the host device for first data associated with a first LBA and a host L2P entry associated with the first data, the host L2P entry comprising: a physical address of the first LBA on the storage system according to a host L2P table; and a physical address of a portion of the L2P table on the storage system associated with the first LBA, maintain a relationship between the physical address of the L2P table on the storage system and the first-level L2P table associated with the first LBA in a second-level L2P table; and validate the physical address of the first LBA from the host L2P entry using the physical address of the portion of the host L2P table associated with the first LBA and the second-level L2P table.

In Example 17, the subject matter of Example 16 optionally includes wherein the group of non-volatile memory cells are organized into sub-regions, the sub-regions organized into multiple clusters of physical addresses, wherein the instructions that, when executed by the control circuitry of the storage system, cause the storage system to perform operations comprise: maintaining a bitmap of validity of the multiple clusters on a first group of volatile memory cells of the storage system; and assigning a cluster as invalid in response to a detected low-power state of the storage system without a subsequent write or update of a portion of the bitmap associated with the cluster.

In Example 18, the subject matter of any one or more of Examples 16-17 optionally include wherein the instructions that, when executed by the control circuitry of the storage system, cause the storage system to perform operations comprising: determine, in response to the received read command, the validity of the cluster associated with the first LBA and the host L2P entry; determine, if the cluster associated with the first LBA and the host L2P entry is determined as invalid, a match of the physical address of the portion of the host L2P table associated with the first LBA and the physical address of the L2P table on the storage system stored in the second-level L2P table, and assign, if the physical address of the portion of the host L2P table associated with the first LBA matches the physical address of the L2P table on the storage system stored in the second-level L2P table, the cluster associated with the first LBA and the host L2P entry as valid.

In Example 19, the subject matter of Example 18 optionally includes wherein the instructions that, when executed by the control circuitry of the storage system, cause the storage system to perform operations comprising: assign, if the physical address of the portion of the host L2P table associated with the first LBA matches the physical address of the L2P table on the storage system stored in the second-level L2P table, each cluster associated with the portion of the host L2P table as valid associated with the host L2P entry as valid.

In Example 20, the subject matter of any one or more of Examples 18-19 optionally include wherein the host L2P entry associated with the first data comprises 8 bits, wherein the physical address of the first LBA on the storage system according to the host L2P table comprises 4 bytes, and wherein the physical address of a portion of the L2P table on the storage system associated with the first LBA comprises 4 bytes.

In Example 21, subject matter (e.g., a system or apparatus) may optionally combine any portion or combination of any portion of any one or more of Examples 1-20 to comprise "means for" performing any portion of any one or more of the functions or methods of Examples 1-20, or at least one "non-transitory machine-readable medium" including instructions that, when performed by a machine, cause the machine to perform any portion of any one or more of the functions or methods of Examples 1-20.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
a host device comprising a host processor and a group of volatile memory cells,
wherein the host processor is configured to:
receive logical-to-physical (L2P) table information from a storage system over a communication interface, the L2P table information comprising:
a physical address of a first logical block address (LBA) at the storage system; and
a physical address of a portion of the received L2P table information at the storage system comprising the physical address of the first LBA at the storage system;
maintain a host L2P table at a physical address on the host device using the received L2P table information, the host L2P table comprising a first host L2P entry comprising:
the physical address of the first LBA at the storage system; and
the physical address of the portion of the L2P table at the storage system associated with the first LBA; and
provide a read command to the storage system for first data associated with the first host L2P entry, the read command comprising:
a first set of bytes comprising the physical address of the first LBA at the storage system extracted from the first host L2P entry of the host L2P table; and
a second set of bytes comprising the physical address of the portion of the L2P table at the storage system associated with the first LBA extracted from the first host L2P entry of the host L2P table.

2. The system of claim 1, comprising the storage system comprising a group of non-volatile memory cells and control circuitry, wherein the control circuitry is configured to:
maintain, in an L2P table on the storage system, a relationship between the first LBA and a physical address of first data associated with the first LBA on the storage system;
receive the read command associated with the first LBA and the first host L2P entry; and validate the physical address of the first LBA from the first host L2P entry using a physical address of the L2P table on the storage system.

3. The system of claim 1, comprising the storage system comprising a group of non-volatile memory cells and control circuitry, wherein the control circuitry is configured to:
    maintain, in an L2P table on the storage system, a relationship between a LBA and a physical address of data stored on the group of non-volatile memory cells; and
    provide the L2P table information to the host device over the communication interface.

4. The system of claim 1, wherein the first host L2P entry associated with the first data is a sequential 8-byte L2P entry,
    wherein 4 bytes of the sequential 8-byte L2P entry are reserved for the physical address of the first LBA on the storage system, and
    wherein 4 bytes of the sequential 8-byte L2P entry are reserved for the physical address of a portion of the first level L2P table on the storage system.

5. The system of claim 1, wherein to maintain the host L2P table at the physical address on the host device comprises to store the received L2P table information associated with the first LBA in the first host L2P entry, the first host L2P entry including sequential bytes in the host L2P table comprising:
    a first set of bytes of the first host L2P entry comprising the physical address of the first LBA at the storage system; and
    a second set of bytes of the first host L2P entry, sequential with the first set of bytes, comprising the physical address of the portion of the received L2P table information at the storage system, and
wherein to provide the read command to the storage system for first data associated with the first host L2P entry comprises providing, in sequential bytes:
    the first set of bytes of the first host L2P entry comprising the physical address of the first LBA at the storage system; and
    the second set of bytes of first host L2P entry, sequential with the first set of bytes, comprising the physical address of the portion of the received L2P table information at the storage system.

6. The system of claim 1, wherein the first host L2P entry has a space on the host device not larger than 8 bytes, and
    wherein the portion of the received L2P table information at the storage system comprising the physical address of the first LBA at the storage system comprises physical addresses of a plurality of LBA including the first LBA.

7. A system, comprising:
a storage system comprising a group of non-volatile memory cells and control circuitry,
wherein the control circuitry is configured to:
receive a read command from the host device for first data associated with a first host logical-to-physical (L2P) entry comprising a number of sequential bytes, including:
    in a first set of bytes, a physical address of a first logical block address (LBA) at the storage system according to extracted from a host L2P table; and
    in a second set of bytes, a physical address of a portion of an L2P table at the storage system associated with the first LBA according to extracted from the host L2P table;

maintain, in an L2P table on the storage system, a relationship between the first LBA and a physical address of first data associated with the first LBA on the storage system; and
validate the physical address of the first LBA from the first host L2P entry using a physical address of the L2P table on the storage system.

8. The system of claim 7, wherein the control circuitry is configured to:
    maintain, in an L2P table on the storage system, a relationship between the first LBA and a physical address of first data associated with the first LBA stored on the group of non-volatile memory cells; and
    provide first level L2P table information to the host device over a communication interface.

9. The system of claim 7, comprising:
the host device comprising a host processor and a group of volatile memory cells,
wherein the host processor is configured to:
    receive L2P table information from the storage system over a communication interface;
    maintain the host L2P table at a physical address on the host device using the received L2P table information; and
    provide the read command to the storage system for the first data associated with the first LBA and the first host L2P entry associated with the first data, the first host L2P entry comprising the number of sequential bytes, including:
        the first set of bytes comprising the physical address of the first LBA at the storage system extracted from the host L2P table; and
        the second set of bytes comprising the physical address of the portion of the L2P table at the storage system associated with the first LBA extracted from the host L2P table.

10. The system of claim 7, wherein the first host L2P entry associated with the first data comprises an is a sequential 8-byte L2P entry,
    wherein 4 bytes of the sequential 8-byte L2P entry are reserved for the physical address of the first LBA on the storage system according to the host L2P table, and
    wherein 4 bytes of the sequential 8-byte L2P entry are reserved for the physical address of a portion of the first level L2P table on the storage system associated with the first LBA.

11. The system of claim 7, wherein the number of sequential bytes of the first host L2P entry is not larger than 8 bytes, and
    wherein the portion of the received L2P table information at the storage system comprising the physical address of the first LBA at the storage system comprises physical addresses of a plurality of LBA including the first LBA.

12. A method comprising:
receiving, using a host device comprising a host processor and a group of volatile memory cells, logical-to-physical (L2P) table information from a storage system over a communication interface, the L2P table information comprising:
    a physical address of a first logical block address (LBA) at the storage system; and
    a physical address of a portion of the received L2P table information at the storage system comprising the physical address of the first LBA at the storage system;

maintaining, using the host processor of the host device, a host L2P table at a physical address on the host device using the received L2P table information, the host L2P table comprising a first host L2P entry comprising:
- the physical address of the first LBA at the storage system; and
- the physical address of the portion of the L2P table at the storage system associated with the first LBA; and providing, using the host processor, a read command to the storage system for first data associated with the first host L2P entry, the read command comprising:
- a first set of bytes comprising the physical address of the first LBA at the storage system extracted from the first host L2P entry of the host L2P table; and
- a second set of bytes comprising the physical address of the portion of the L2P table at the storage system associated with the first LBA extracted from the first host L2P entry of the host L2P table.

13. The method of claim 12, comprising:
maintaining, using control circuitry of the storage system, a relationship between the first LBA and a physical address of first data associated with the first LBA on the storage system;
receiving, at the storage system, the read command associated with the first LBA and the first host L2P entry; and
validating, at the storage system, the physical address of the first LBA from the first host L2P entry using a physical address of the L2P table on the storage system.

14. The method of claim 12, comprising:
maintaining, using control circuitry of the storage system comprising a group of non-volatile memory cells, a relationship between the first LBA and a physical address of first data associated with the first LBA stored on the group of non-volatile memory cells in an L2P table on the storage system; and
providing, using the control circuitry, the L2P table information to the host device over the communication interface.

15. The system of claim 12, wherein maintaining the host L2P table at the physical address on the host device comprises storing the received L2P table information associated with the first LBA in the first host L2P entry, the first host L2P entry comprising:
- a first set of bytes of the first host L2P entry comprising the physical addresses of the first LBA at the storage system; and
- a second set of bytes of the first host L2P entry, sequential with the first set of bytes, comprising the physical address of the portion of the received L2P table information at the storage system, and wherein providing the read command to the storage system for first data associated with the first host L2P comprises providing, in sequential bytes:
- the first set of bytes of the first host L2P entry comprising the physical address of the first LBA at the storage system; and
- the second set of bytes of first host L2P entry, sequential with the first set of bytes, comprising the physical address of the portion of the received L2P table information at the storage system.

16. The method of claim 12, wherein the first host L2P entry has a space on the host device not larger than 8 bytes, and wherein the portion of the received L2P table information at the storage system comprising the physical address of the first LBA at the storage system comprises physical addresses of a plurality of LBA including the first LBA.

17. A method, comprising:
receiving, using control circuitry of a storage system comprising a group of non-volatile memory cells, a read command from the host device for first data associated with a first host logical-to-physical (L2P) entry comprising a number of sequential bytes, including:
- in a first set of bytes, a physical address of a first logical block address (LBA) at the storage system extracted from a host L2P table; and
- in a second set of bytes, a physical address of a portion of an L2P table at the storage system associated with the first LBA extracted from the host L2P table;

maintaining, using the control circuitry, a relationship between the first LBA and a physical address of first data associated with the first LBA on the storage system; and
validating, using the control circuitry, the physical address of the first LBA from the first host L2P entry using a physical address of the L2P table on the storage system.

18. The method of claim 17, comprising:
maintaining, using the control circuitry, a relationship between the first LBA and a physical address of first data associated with the first LBA stored on the group of non-volatile memory cells in an L2P table on the storage system; and
providing, using the control circuitry, L2P table information to the host device over a communication interface.

19. The method of claim 18, wherein the first host L2P entry associated with the first data is a sequential 8-byte L2P entry,
wherein 4 bytes of the sequential 8-byte L2P entry are reserved for the physical address of the first LBA on the storage system according to the host L2P table, and
wherein 4 bytes of the sequential 8-byte L2P entry are reserved for the physical address of a portion of the L2P table on the storage system associated with the first LBA.

20. The method of claim 17, comprising:
receiving, using a host processor of a host device comprising a group of volatile memory cells, L2P table information from the storage system over a communication interface;
maintaining, using the host processor, the host L2P table at a physical address on the host device using the received L2P table information; and
providing, using the host processor, the read command to the storage system for the first data associated with the first LBA and the first host L2P entry associated with the first data, the first host L2P entry comprising the number of sequential bytes, including:
- the first set of bytes comprising the physical address of the first LBA at the storage system extracted from the host L2P table; and
- the second set of bytes comprising the physical address of the portion of the L2P table at the storage system associated with the first LBA extracted from the host L2P table.

* * * * *